United States Patent
Tran (10) Patent No.: US 9,596,559 B2
(45) Date of Patent: Mar. 14, 2017

(54) EFFICIENT MACHINE-TO-MACHINE DATA NOTIFICATIONS

(71) Applicant: Verizon Patent and Licensing Inc., Arlington, VA (US)

(72) Inventor: Phan Anh Tran, Escondido, CA (US)

(73) Assignee: VERIZON PATENT AND LICENSING INC., Basking Ridge, NJ (US)

(*) Notice: Subject to any disclaimer, the term of this patent is extended or adjusted under 35 U.S.C. 154(b) by 166 days.

(21) Appl. No.: 14/057,907

(22) Filed: Oct. 18, 2013

(65) Prior Publication Data

US 2015/0110129 A1  Apr. 23, 2015

(51) Int. Cl.
  *H04W 4/00* (2009.01)
  *H04W 68/00* (2009.01)

(52) U.S. Cl.
  CPC ......... *H04W 4/006* (2013.01); *H04W 68/005* (2013.01)

(58) Field of Classification Search
  CPC ......... H04W 4/005; H04W 4/22; H04W 8/02; G06F 19/30; G06F 19/32; G06F 19/34; G06F 19/3406; G06F 19/3418; G06F 19/3487; A61B 5/0002; A61B 5/0004; A61B 5/0015; A61B 5/0022; A61B 5/0024; A61B 5/02; A61B 5/742; A61B 5/743; A61B 5/7435; A61B 5/746; A61B 5/7465; A61B 5/1432
  See application file for complete search history.

(56) References Cited

U.S. PATENT DOCUMENTS

| | | | |
|---|---|---|---|
| 2006/0193318 A1* | 8/2006 | Narasimhan | H04L 12/5693 370/389 |
| 2007/0260673 A1* | 11/2007 | Shenfield | H04L 67/325 709/203 |
| 2008/0059080 A1* | 3/2008 | Greiner et al. | 702/33 |
| 2010/0318624 A1* | 12/2010 | Pattan | H04L 67/325 709/207 |
| 2012/0033551 A1* | 2/2012 | Liao | H04W 28/02 370/230 |
| 2012/0213165 A1* | 8/2012 | Miklos et al. | 370/329 |
| 2014/0067902 A1* | 3/2014 | Wang et al. | 709/201 |
| 2014/0293861 A1* | 10/2014 | Kim et al. | 370/312 |
| 2015/0038110 A1* | 2/2015 | Zhu | H04W 4/26 455/406 |

* cited by examiner

*Primary Examiner* — Andrew Chriss
*Assistant Examiner* — Romani Ohri (57) ABSTRACT

A server device may be configured to store association information that associates a group of machine-to-machine ("M2M") devices with a group of customer devices; identify, based on the association information, a particular customer device, of the group of customer devices, associated with one or more M2M devices from which M2M data was received by the server device; output, using a connectionless communication technique, a notification to the particular customer device, the notification being based on the received M2M data; receive a request for M2M data associated with the particular customer device; and output the received M2M data to the particular customer device.

20 Claims, 7 Drawing Sheets

| M2M device(s) | Customer device | Notification parameters |
|---|---|---|
| 105-1, 105-2 | 115-1 | Every hour |
| 105-3 | 115-2 | Each time M2M data is received |
| 105-4, 105-5, 105-6 | 115-3 | Upon event detection |
| 105-7, 105-8 | 115-4 | Every 10 readings |

EFFICIENT MACHINE-TO-MACHINE DATA NOTIFICATIONS

BACKGROUND

Machine to machine ("M2M") devices may include computing devices that sense information (e.g., environment or weather information such as temperature, humidity, moisture, or pressure information, light intensity, magnetic or electric field magnitude, inventory levels, vehicle performance or machine performance information, device location information, or other types of information). M2M devices may also communicate sensed information to other computing devices (e.g., a user's personal computer), which may act on the information. In some situations, thousands or millions of M2M devices may transmit data to a network provider's central M2M server, which may distribute the data to various destinations (e.g., customers' computing devices and/or other data centers).

DETAILED DESCRIPTION OF PREFERRED EMBODIMENTS

The following detailed description refers to the accompanying drawings. The same reference numbers in different drawings may identify the same or similar elements.

A system and/or method, described herein, may provide efficient distribution of data collected and reported by M2M devices. For instance, some implementations may utilize an architecture in which a large quantity (e.g., hundreds of thousands, millions, or more) of M2M devices (e.g., temperature sensors, heartbeat monitors, home monitoring devices, etc.) report M2M data to a central M2M server (or a set of M2M servers), which may distribute the data to other devices (e.g., user devices, web portals, M2M data repositories, etc.).

Figure 1:
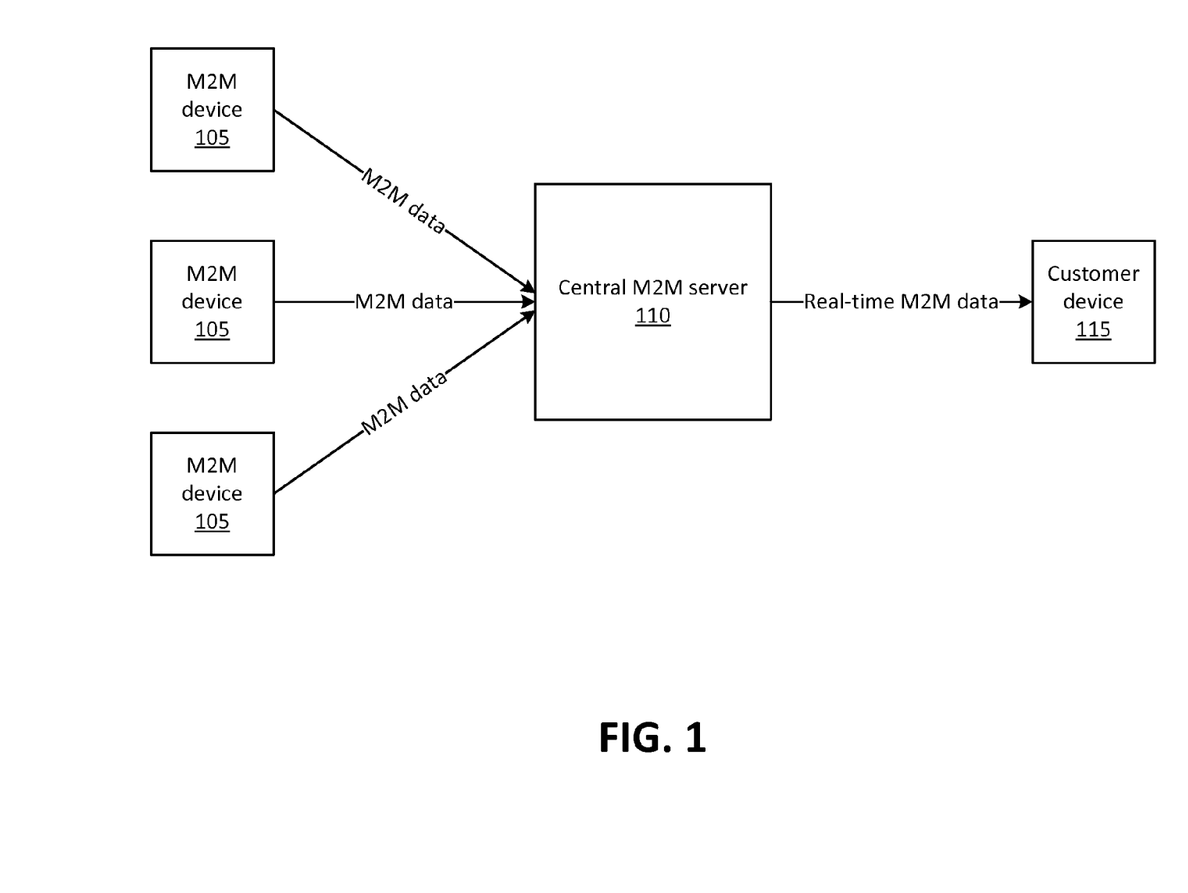
FIG. 1 illustrates an example of the distribution of M2M data using an existing technique.

FIG. 1 illustrates the potential pitfalls of using an existing delivery technique for delivering M2M data. As shown, a set of M2M devices 105 may transmit M2M data to a central M2M server 110. Although three M2M devices 105, are shown in the figure, in practice, many (e.g., thousands, millions, or more) M2M devices 105 may be in communication with central M2M server 110, and may be transmitting M2M data to central M2M server 110. M2M devices 105 may each transmit M2M data to central M2M server 110 on a periodic basis, such that central M2M server 110 receives M2M data at a relatively high rate (e.g., thousands of communications per second). As shown, central M2M server 110 may output M2M data to customer device 115 (e.g., a user device, a web server, an information repository, etc.).

As shown, central M2M server 110 may establish a connection with customer device 115, over which central M2M server 110 outputs M2M data received from M2M devices 105 in real time (or near-real time), and via which customer device 115 responds with acknowledgments, indicating that the M2M data was received. For instance, when central M2M server 110 receives M2M data from a particular M2M device 105, central M2M server 110 may output the M2M data to customer device 115. In order to do so, the connection between central M2M server 110 and customer device 115 may remain open, thus consuming resources (e.g., processing and/or network resources) of central M2M server 110. In a situation where thousands or millions of customer devices 115 are in communication with central M2M server 110, maintaining open connections with so many customer devices 115 may cause a degradation of performance, and/or may be costly, unfeasible, or even impossible to implement. For instance, if a subset of customer devices 115 is slow in responding, the time required to maintain the connections with the subset of customer devices 115 may increase, thus holding on to resources much longer and placing additional strain on central M2M server 110.

Figure 2:
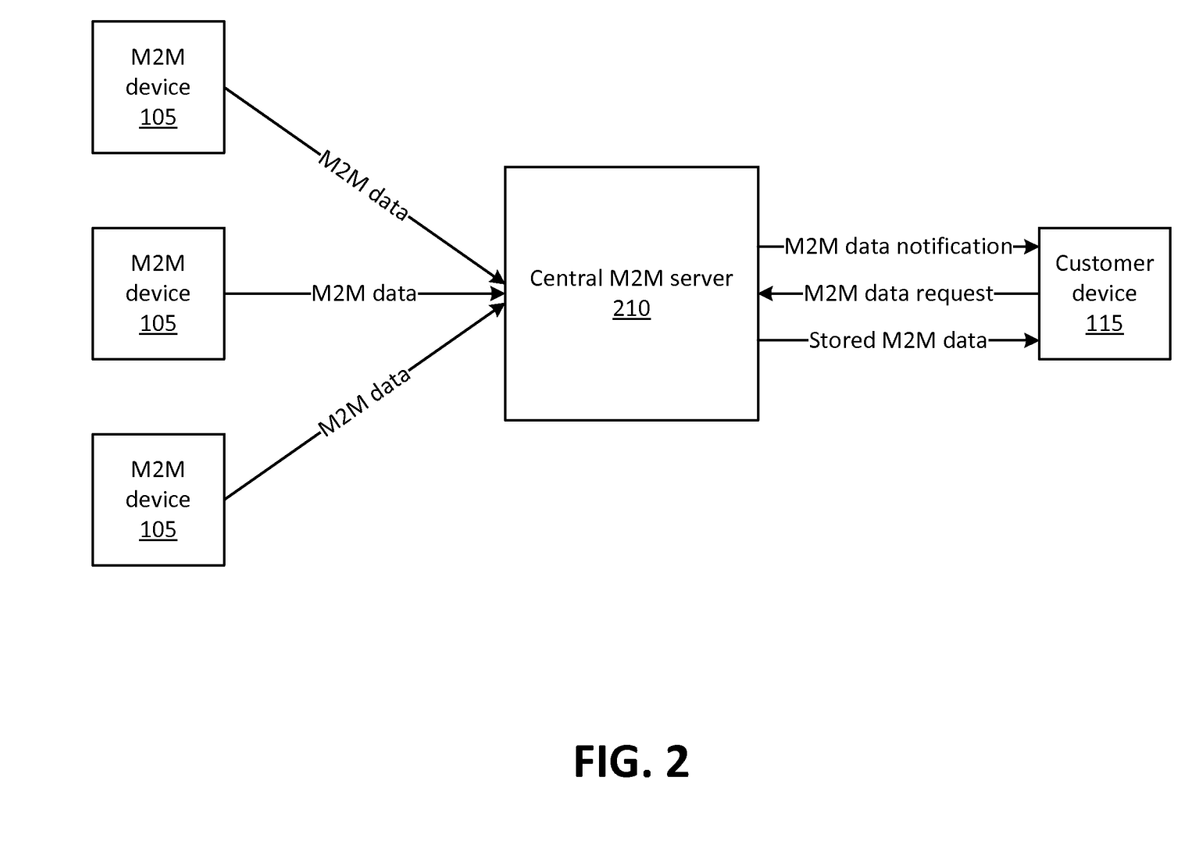
FIG. 2 illustrates an example overview of one or more implementations described herein.

FIG. 2 illustrates an example overview of implementations described herein, in which M2M data may be provided to customers' devices, while minimizing the impact on the resource usage of a central M2M server. As shown (and similar to the example shown in FIG. 1), a set of M2M devices 105 may transmit M2M data to a central M2M server 210. As with the above example, central M2M server 210 may receive M2M data from various M2M devices 105 at a relatively high rate. In accordance with some implementations, central M2M server 210 may store received M2M data, and may periodically or intermittently send notifications to a particular customer device 115, to whom the M2M data should be sent. For instance, central M2M server 210 may send a notification once a particular amount of M2M data has been received, upon the detection of an event, on a periodic time interval, etc.

For example, different customer devices 115 may be associated with different sets of M2M devices 105, and when central M2M server 210 detects that M2M data has been received from a particular M2M device 105, central M2M server 210 may send a notification to the particular customer device 115 associated with the particular M2M device 105. In some implementations, this notification may be sent independently of the reception of the M2M data, and/or may be sent using a connectionless communication technique, such as User Datagram Protocol ("UDP").

Based on this notification, customer device 115 may send a request, for the stored M2M data associated with customer device 115, to central M2M server 210. Central M2M server 210 may send the requested data to customer device 115. Thus, central M2M server 210 may forgo sending M2M data to customer devices 115 in real time (or near-real time). Instead, central M2M server 210 may send the M2M data to customer devices 115 on a more infrequent, or "as-needed" basis, thus conserving resources of central M2M server 210. Since connections do not need to be constantly maintained with customer device 115, resources of central M2M server 210 may further be conserved. Furthermore, the usability impact on customer devices 115 may be minimal, as central M2M server 210 may be configured to send a notification on a periodic or intermittent basis that provides meaningful information to customer device 115.

Figure 3:
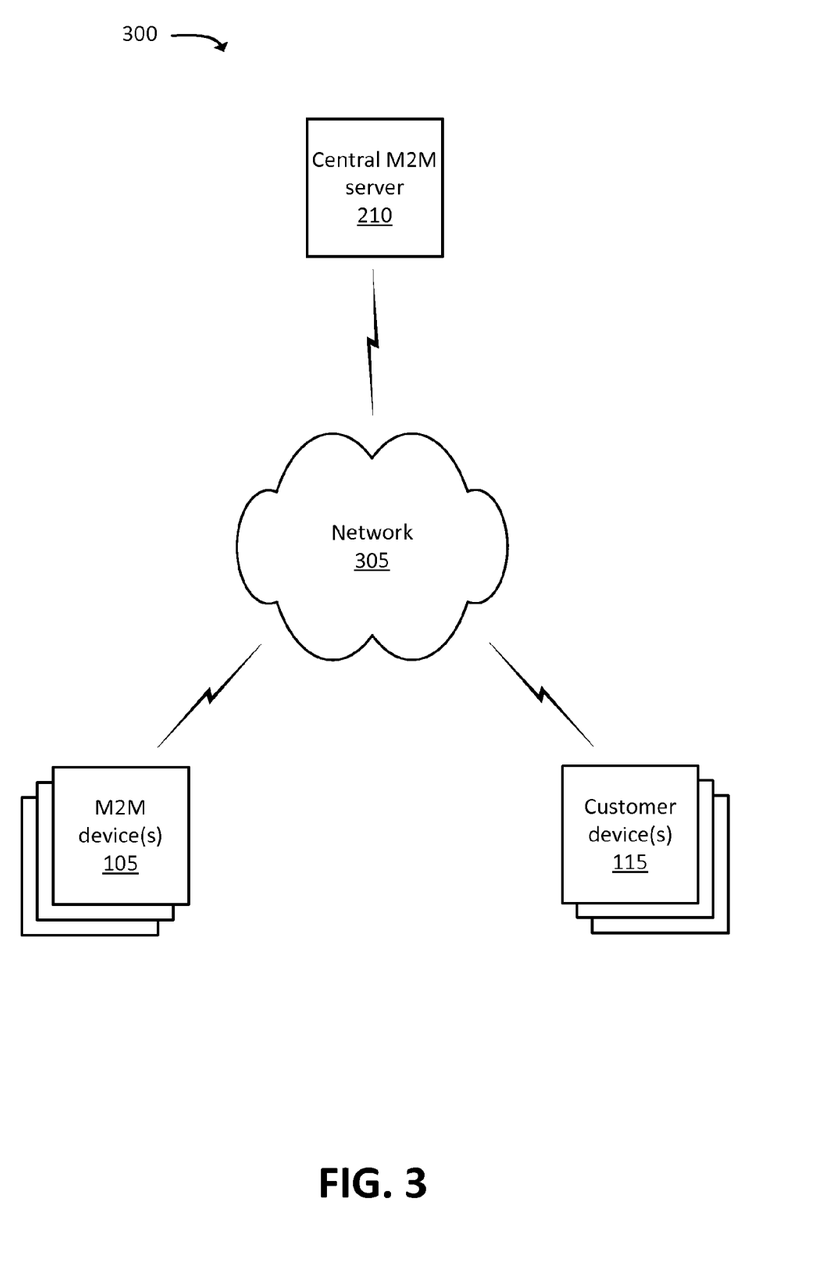
FIG. 3 illustrates an example environment in which systems and/or methods, described herein, may be implemented.

FIG. 3 illustrates an example environment 300, in which systems and/or methods described herein may be implemented. As shown in FIG. 3, example environment 300 may include one or more M2M devices 105, central M2M server 210, one or more customer devices 115, and network 320.

The quantity of devices and/or networks, illustrated in FIG. 3, is provided for explanatory purposes only. In practice, environment 300 may include additional devices and/or networks; fewer devices and/or networks; different devices and/or networks; or differently arranged devices and/or networks than illustrated in FIG. 3. Alternatively, or additionally, one or more of the devices of environment 300 may perform one or more functions described as being performed by another one or more of the devices of environment 300. Devices of environment 300 may interconnect via wired connections, wireless connections, or a combination of wired and wireless connections.

M2M device 105 may include a computation and communication device, which may collect and output data. For example, M2M device 105 may include a microphone, a video camera, a heartbeat monitor, a thermometer, a speed sensor, and/or another type of data collection device. M2M device 105 may send traffic to and/or receive traffic from central M2M server 210 (e.g., via network 305). M2M device 105 may be designed and/or configured to communicate with central M2M server 210 using a specific set of communication protocols that are designated for M2M devices (e.g., a BiTXml™ protocol, a M2MXML™ protocol, an M2M service layer (as developed by, for example, the International Telecommunication Union Telecommunication Standardization Sector ("ITU-T")), and/or another protocol or communication technique).

In some implementations, "M2M device 105," as used herein, may refer to a non-M2M device (e.g., a radiotelephone; a personal communications system ("PCS") terminal (e.g., a device that combines a cellular radiotelephone with data processing and data communications capabilities); a personal digital assistant ("PDA") (e.g., that can include a radiotelephone, a pager, Internet/intranet access, etc.); a smart phone; a laptop computer; a tablet computer; a camera; a personal gaming system, or another type of mobile computation and communication device) that is communicatively coupled to an M2M gateway device. Together, a non-M2M device and a M2M gateway device may act as an M2M device. That is, a M2M gateway may translate communications sent from a non-M2M device (e.g., a device that does not communicate using M2M communication protocols) to communications according to a M2M protocol, to facilitate communications between the non-M2M device and central M2M server 210.

Central M2M server 210 may include a computation and communication device that receives M2M data and efficiently outputs the received data to respective customer devices 115. For example, central M2M server 210 may include a server device that communicates with M2M devices 105 via one or more communication protocols associated with M2M communications, as described above. Central M2M server 210 may include one or more storage devices, which may store configuration information (e.g., information that associates M2M services 105 with respective customer devices 115, information that indicates intervals on which customer devices 115 should be notified of new M2M data, etc.).

Customer device 115 may include a computation and communication device that receives M2M data provided by central M2M server 210. Customer device 115 may include, for instance, a web server, a data center, a personal computer, a smart phone, and/or another type of device. Customer device 115 may include a network communication device via which customer device 115 may communicate with central M2M server 210 (either wirelessly or via a wired connection). Each customer device 115 (or set of customer devices 115) may be associated with a particular customer, who may also be associated with a particular set of M2M devices 105. As mentioned above, central M2M server 210 may store information (e.g., association information) that associates customer devices 115 with M2M devices 105 (e.g., a customer may own or operate a set of M2M devices 105 and a set of customer devices 115). Customer device 115 may include an output device (e.g., a monitor or another device), via which received M2M data may be displayed.

While devices (e.g., M2M device 105, central M2M server 210, and customer device 115) are shown FIG. 3 as single blocks, in some implementations, one or more of these devices may be implemented by multiple physical devices, and/or may be included as hardware and/or software portions of another device. For example, in some implementations, M2M device 105, central M2M server 210, and/or customer device 115 may be implemented in a cloud computing environment, in which multiple different computing devices may implement a single M2M device 105, central M2M server 210, and/or customer device 115. In some implementations, M2M device 105, central M2M server 210, and/or customer device 115 may be implemented as a software service (e.g., via one or more virtual machines) that reside on one or more physical hardware devices in a data center.

Network 305 may include one or more wired and/or wireless networks. For example, network 305 may include a cellular network, a public land mobile network ("PLMN"), a second generation ("2G") network, a third generation ("3G") network, a fourth generation ("4G") network, a fifth generation ("5G") network, and/or another network. Additionally, or alternatively, network 305 may include a wide area network ("WAN"), a metropolitan area network ("MAN"), a telephone network (e.g., the Public Switched Telephone Network ("PSTN")), an ad hoc network, an intranet, a packet data network ("PDN") such as the Internet, a fiber optic-based network, and/or a combination of these or other types of networks.

Figure 4:
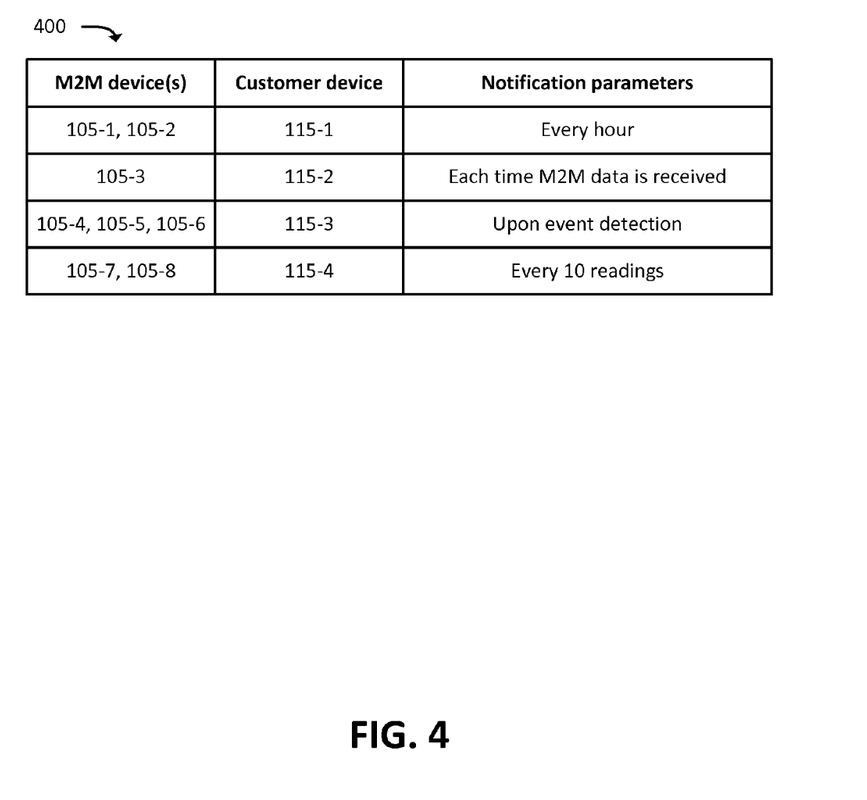
FIG. 4 illustrates an example data structure that may be stored by a central M2M server.

FIG. 4 illustrates an example data structure 400, which may be stored by central M2M server 210. Data structure 400 may store information associating M2M devices 105 with customer devices 115, and may also store configuration information that indicates a manner in which customer devices 115 should be notified of new M2M data. As shown, data structure 400 may include the following fields: "M2M device(s)," "customer device," and "notification parameters." The "M2M device(s)" field may include information identifying one or more M2M devices 105, such as Internet Protocol ("IP") addresses, Machine Access Control ("MAC") addresses, International Mobile Subscriber Identity ("IMSI") numbers, International Mobile Equipment Identity ("IMEI") numbers, a service layer M2M device identifier, and/or other identifying information. The "customer device" field may include information identifying one or more customer devices 115, such as IP addresses, MAC addresses, etc.

The "notification parameters" field may include notification parameters which indicate, on a per-customer device basis, a manner in which customer devices 115 should be notified regarding M2M data received from associated M2M devices 105. As shown, one example notification parameter may indicate a time interval on which notifications should be periodically outputted (e.g., "every hour"). Using this type of parameter, when M2M data is available for a particular customer device 115, central M2M server 210 may output a notification regarding the available M2M data according to the indicated time interval.

Another example notification parameter may indicate that notifications are triggered by the receipt of M2M data. For example, central M2M server 210 may use this type of parameter to notify a particular customer device 115 (e.g., customer device 115-2, as shown) each time M2M data is received from an M2M device 105 associated with customer device 115. As another example, as also shown, central M2M server 210 may use this type of parameter to notify a particular customer device 115 (e.g., customer device 115-4, as shown) every ten times M2M data is received from an M2M device 105 associated with customer device 115.

As yet another example, an example notification parameter may indicate that notifications should be sent upon the detection of an event. For example, central M2M server 210 may analyze M2M data received from M2M devices 105, and may detect an event based on the M2M data. Assume, for instance, that a particular M2M device 105 sends temperature data to central M2M server 210, and central M2M server 210 is configured to detect that an event has occurred when the received temperature data indicates that a sensed temperature is below a certain threshold. As another example, assume that a particular M2M device 105 sends data corresponding to a human heartbeat monitor to central M2M server 210, and central M2M server 210 is configured to detect that an event has occurred when the received heartbeat monitor data indicates that a sensed heartbeat is below a certain threshold.

While examples of types of notification parameters are shown in FIG. 4, in practice, additional or different types of notification parameters may be used. Further, while one notification parameter is shown for each customer device 115, in some implementations, multiple notification parameters may be used for a particular customer device 115. For instance, a particular customer device 115 may be associated with a set of notification parameters whereby the customer device 115 is notified every hour, and additionally each time an event is detected. In some implementations, different types of M2M data (e.g., M2M data received from different M2M devices 105) may be associated with different notification parameters.

In some implementations, some or all of the information stored in data structure 400 may be received from, for example, an administrator associated with central M2M server 210. In some implementations, some or all of the information stored in data structure 400 may be received from another user, such as a customer associated with M2M device 105 or customer device 115, or a manufacturer or a vendor associated with M2M device 105 and/or customer device 115.

Figure 5:
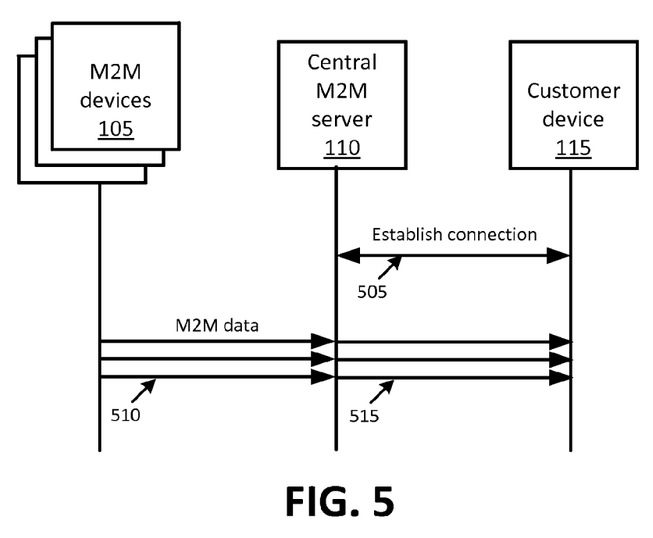
FIG. 5 illustrates an example signal flow corresponding to the distribution of M2M data using an existing technique.

FIG. 5 illustrates an example signal flow that may correspond to a problematic technique for relaying M2M data. The signals shown in FIG. 5 may correspond to, for example, the example shown in FIG. 1. As shown, central M2M server 110 may establish (at 505) a communication session with customer device 115. The communication session may be a connection in which communications, from central M2M server 110 to customer device 115, are reliably delivered using a communication protocol that includes error checking (e.g., by using acknowledgment messages to confirm receipt of transmitted data). In one example implementation, the communication session may correspond to a Transmission Control Protocol ("TCP") connection. Customer device 115 may be associated with the illustrated M2M devices 105 (e.g., a customer or subscriber may own, operate, or otherwise be associated with customer device 115 and M2M devices 105).

M2M devices may output (at 510) M2M data to central M2M server 110 on an ongoing basis, and central M2M server 110 may forward (at 515) the M2M data to customer device 115 as central M2M server 110 receives the M2M data. When forwarding the M2M data to customer device 115, the communication session (established at 505) may remain open. In some instances, even when there is no M2M data to forward to customer device 115, the connection may remain open. In some situations, central M2M server 110 may be configured to close the connection with customer device 115 when there is no more M2M data to forward, or when data has not been received for a particular threshold period (e.g., an inactivity period). In some situations, the link between central M2M server 110 and customer device 115 may become slow or unavailable. In these situations, forwarding (at 515) the M2M data may cause resources (e.g., processor resources and/or network resources) to maintain the link. Maintaining a large number (e.g., thousands or millions) of connections (e.g., TCP connections) can become computationally burdensome.

Figure 6:
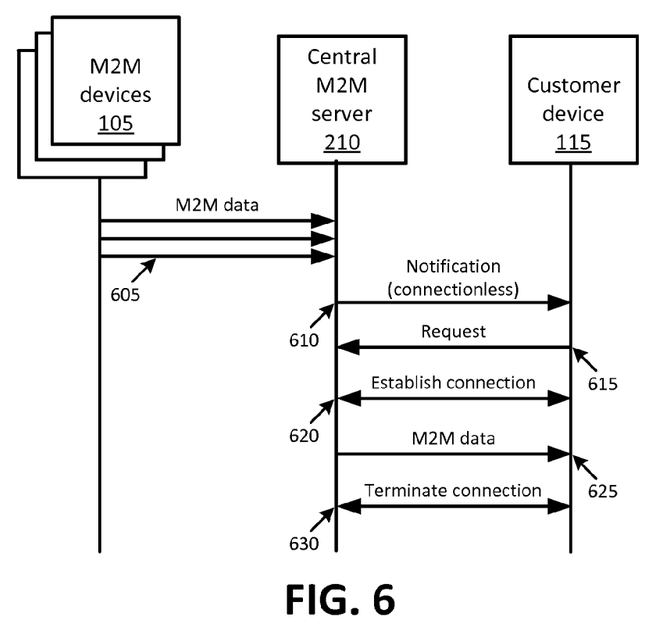
FIG. 6 illustrates an example signal flow corresponding to one or more implementations described herein.

FIG. 6 illustrates a more efficient technique for forwarding M2M data, in accordance with some implementations. As shown, a set of M2M devices 105 may output (at 605) M2M data to central M2M server 210. The illustrated outputting (at 605) may correspond to a number of transmissions that occur over a period of time (e.g., over one second, one minute, one hour, etc.). Central M2M server 210 may store the received M2M data, and may identify that the stored M2M data is associated with customer device 115. Based on notification parameters associated with customer device 115 (e.g., as stored in, for example, data structure 400), central M2M server 210 may output (at 610) a notification to customer device 115.

The notification may be outputted (at 610) using a connectionless (e.g., transaction-based) communication technique (e.g., UDP). By using a connectionless communication technique, central M2M server 210 may avoid a situation in which a connection (e.g., a TCP session) is maintained between central M2M server 210 and customer device 115. By using a connectionless communication technique, resources of central M2M server 210 may be conserved relative to using a communication technique such as TCP.

Based on the notification (outputted at 610), customer device 115 may output a request to central M2M server 210 for the M2M data associated with customer device 115. In some implementations, the request may be automatically generated by customer device 115 when the notification is received, while in some implementations, the request may be generated based on input or feedback by a user of customer device 115. In some implementations, the request may specify a desired set of data (e.g., M2M data that corresponds to a particular time period, or a particular event, etc.). In some situations, the request may specify all available M2M data associated with customer device 115, or may not include any such specification at all.

Central M2M server 210 and customer device 115 may establish (at 620) a connection (e.g., a TCP connection), based on the request. Central M2M server 210 may output (at 625) the requested M2M data to customer device 115 (e.g., over the established connection, or in other implementations, using a connectionless communication technique). For instance, if the request specified a particular set of M2M data, central M2M server 210 may output the specified set of M2M data to customer device 115. If the request specified all available M2M data associated with customer device 115 (or did not specify a set of data), central M2M server 210 may output (at 625) all stored M2M data associated with customer device 115. In some implementations, instead of outputting all stored M2M data associated with customer device 115, central M2M server 210 may output M2M data that has been received since a previous transmission of M2M data to customer device 115. In this sense, central M2M server 210 may only output the latest M2M data to customer device 115.

Once the M2M data has been received, the connection may be terminated (at 630). For example, customer device 115 may indicate (e.g., via acknowledgment messages) that the M2M data has been received.

Although not shown, in some implementations, central M2M server 210 may re-transmit the notification (sent at 610) if a request for data has not been received from customer device 115 after a particular period of time. For instance, if central M2M server 210 has not received a request for data after one hour, central M2M server 210 may re-transmit the notification (sent at 610). In some implementations, after a particular number of transmissions of the notification (at 610) without receiving a request for data, central M2M server 210 may cease to output the notifications, may attempt to establish a connection with customer device 115, may notify an administrator, and/or may take other remedial measures.

Also, while not shown, customer device 115 may, in some implementations, output an indication to central M2M server 210, indicating that the M2M data (sent at 620) was received. Central M2M server 210 may, according to some implementations, use this indication when determining which data to subsequently send to customer device 115. Central M2M server 210 may, in some implementations, discard M2M data after transmitting (at 620) the M2M data to customer device 115, and/or when receiving an indication from customer device 115 that the M2M data was received (not shown).

In the process shown in FIG. 6, since central M2M server 210 sends (at 610) a connectionless notification to customer device 115, and further since customer device 115 makes the connection request (at 615), resources of central M2M server 210 are not expended in attempting to connect to customer device 115. This may be advantageous in situations where customer device 115 becomes unreachable (e.g., if a communication link fails, if customer device 115 is powered down, etc.), because attempting to connect to customer device 115 in such situations would unnecessarily consume resources of central M2M server 210.

Figure 7:
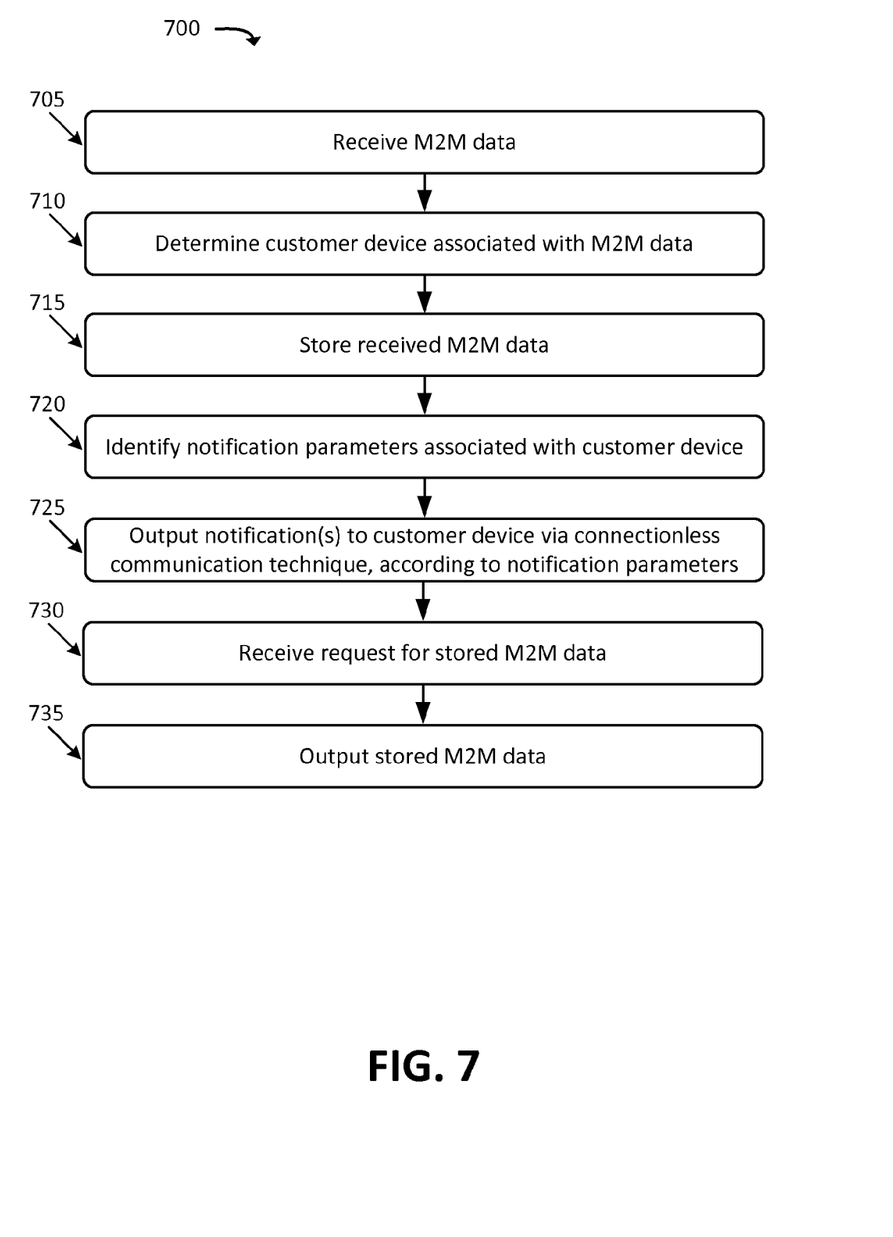
FIG. 7 illustrates an example process for distributing M2M data consistent with aspects described herein.

FIG. 7 illustrates an example process 700 for efficiently distributing M2M data. In one example implementation, process 700 may be performed by central M2M server 210. In some implementations, some or all of process 700 may be performed by one or more other devices in lieu of, or in conjunction with, central M2M server 210. In some implementations, some of the blocks of process 700 may generally correspond to some of the signals shown in FIG. 6.

Process 700 may include receiving M2M data (block 705). For example, central M2M server 210 may receive M2M data from a set of M2M devices 105.

Process 700 may also include determining a customer device customer device 115 associated with the received M2M data (block 710). For example, central M2M server 210 may use information stored in data structure 400 to determine which customer device 115 is associated with the M2M data received at block 705.

Process 700 may additionally include storing the received M2M data (block 715). For instance, central M2M server 210 may store the received M2M data in an associated storage device.

Process 700 may further include identifying notification parameters associated with customer device 115 (block 720). For instance, as described above, central M2M server 210 may identify a manner in which customer device 115 should be notified regarding received M2M data. The notification parameters may be stored in, for example, data structure 400.

Process 700 may also include outputting notifications to customer device 115 via a connectionless communication technique, according to the identified notification parameters (block 725). For instance, as described above, central M2M server 210 may output a notification to customer device 115 at, for example, a desired interval or based on the detection of an event. As described above, when outputting the notification (at block 725), central M2M server 210 may utilize a connectionless communication technique (e.g., UDP).

Process 700 may additionally include receiving a request for the stored M2M data (block 730). For instance, central M2M server 210 may receive, from customer device 115, a request for some or all of the stored M2M data associated with customer device 115. In some implementations, the request may include a request to establish a connection between customer device 115 and central M2M server 210. Based on this request, a connection may be made between customer device 115 and central M2M server 210.

Process 700 may further include outputting the stored M2M data (block 735). For instance, central M2M server 210 may output the requested M2M data to customer device 115. In some implementations, when outputting (at block 735) the stored M2M data to customer device 115, central M2M server 210 may transmit the M2M data via a connection that has been established, based on the request received at block 730. As mentioned above, central M2M server 210 may subsequently receive an indication (e.g., a transmission acknowledgment) from customer device 115, indicating that the M2M data was received. Based on this indication central M2M server 210 may, for instance, discard the stored M2M data associated with customer device 115.

Figure 8:
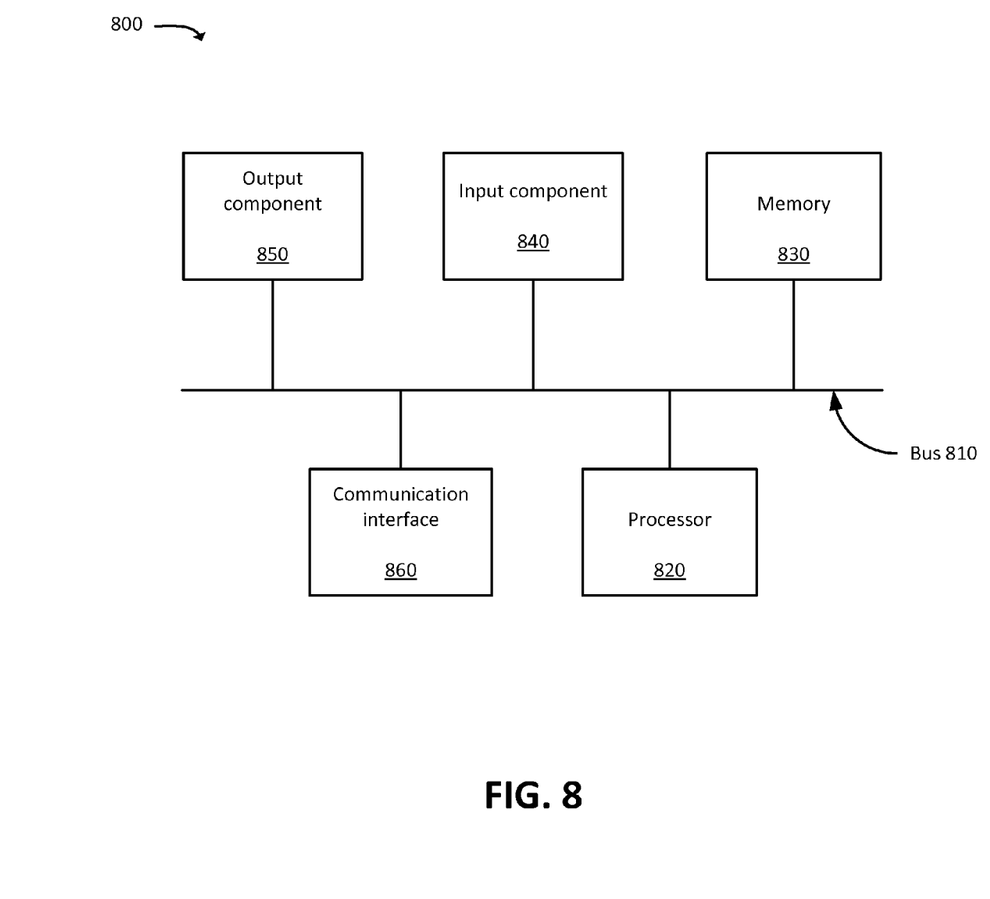
FIG. 8 illustrates example components of one or more devices, according to one or more implementations described herein.

FIG. 8 is a diagram of example components of device 800. One or more of the devices described above (e.g., with respect to FIGS. 1-3, 5, and 6) may include one or more devices 800. Device 800 may include bus 810, processor 820, memory 830, input component 840, output component 850, and communication interface 860. In another implementation, device 800 may include additional, fewer, different, or differently arranged components.

Bus 810 may include one or more communication paths that permit communication among the components of device 800. Processor 820 may include a processor, microprocessor, or processing logic that may interpret and execute instructions. Memory 830 may include any type of dynamic storage device that may store information and instructions for execution by processor 820, and/or any type of non-volatile storage device that may store information for use by processor 820.

Input component 840 may include a mechanism that permits an operator to input information to device 800, such as a keyboard, a keypad, a button, a switch, etc. Output component 850 may include a mechanism that outputs information to the operator, such as a display, a speaker, one or more light emitting diodes ("LEDs"), etc.

Communication interface 860 may include any transceiver-like mechanism that enables device 800 to communicate with other devices and/or systems. For example, communication interface 860 may include an Ethernet interface, an optical interface, a coaxial interface, or the like. Communication interface 860 may include a wireless communication device, such as an infrared ("IR") receiver, a Bluetooth® radio (Bluetooth is a registered trademark of Bluetooth SIG, Inc.), radio, or the like. The wireless communication device may be coupled to an external device, such as a remote control, a wireless keyboard, a mobile telephone, etc. In some embodiments, device 800 may include more than one communication interface 860. For instance, device 800 may include an optical interface and an Ethernet interface.

Device 800 may perform certain operations relating to one or more processes described above. Device 800 may perform these operations in response to processor 820 executing software instructions stored in a computer-readable medium, such as memory 830. A computer-readable medium may be defined as a non-transitory memory device. A memory device may include space within a single physical memory device or spread across multiple physical memory devices. The software instructions may be read into memory 830 from another computer-readable medium or from another device. The software instructions stored in memory 830 may cause processor 820 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations. For example, while series of blocks and/or signals have been described with regard to FIGS. 5-7, the order of the blocks and/or signals may be modified in other implementations. Further, non-dependent blocks and/or signals may be performed in parallel. Also, additional blocks and/or signals may be present, either before, after, or in between the blocks and/or signals shown in these figures.

Further, while examples above describe a connectionless communication technique in the context of UDP, in practice, additional or different connectionless communication techniques may be used. As mentioned above, a connectionless communication technique may be a technique in which a sender of a transmission does not "wait" for an acknowledgment to be received (e.g., maintain an open connection, and/or otherwise maintain a communication state based on receiving or not receiving acknowledgments in response to sent transmissions).

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method, comprising:
    receiving, by a server device, association information that indicates an association between a plurality of machine-to-machine ("M2M") devices and a plurality of customer devices;
    receiving, by the server device, over a particular period of time and from one or more M2M devices, of the plurality of M2M devices, M2M data that has been captured by the one or more M2M devices;
    storing, by the server device, the M2M data received over the particular period of time;
    identifying, by the server device and using the association information, which particular customer device, of the plurality of customer devices, is associated with the one or more M2M devices;
    forgoing outputting, by the server device, the stored M2M data to the identified particular customer device during the particular period of time;
    analyzing, by the server device, the stored M2M data;
    comparing, by the server device, the analyzed M2M data to one or more thresholds;
    detecting, by the server device and based on the comparing, an event;
    outputting, by the server device, based on detecting the event, and using a connectionless communication technique, a notification to the particular customer device, the notification indicating that M2M data is available for the particular customer device;
    receiving, by the server device and in response to the notification, a request for M2M data associated with the particular customer device; and
    outputting, by the server device and based on the received request, the stored M2M data, which was stored by the server device and not outputted to the particular customer device during the particular period of time, to the particular customer device.

2. The method of claim 1, further comprising:
receiving notification parameters associated with the plurality of customer devices, wherein a set of notification parameters for the particular customer device indicates a manner in which the particular customer device should be notified when M2M data is available for the particular customer device,
wherein outputting the notification is further based on the set of notification parameters for the particular customer device.

3. The method of claim 2, wherein the set of notification parameters is received from the customer device.

4. The method of claim 2, wherein the set of notification parameters indicates a periodic interval at which the notification should be outputted by the server device.

5. The method of claim 1, wherein the connectionless communication technique includes a User Datagram Protocol ("UDP") transmission.

6. The method of claim 1, further comprising:
receiving an indication that the particular customer device has received the outputted M2M data; and
discarding, based on the received indication, the M2M data associated with the particular customer device.

7. The method of claim 1, further comprising establishing, based on the request, a connection with the particular customer device,
wherein outputting the received M2M data to the particular customer device includes:
transmitting the M2M data to the particular customer device via the established connection.

8. A server device, comprising:
a memory device storing:
processor-executable instructions, and
association information that indicates an association between a plurality of machine-to-machine ("M2M") devices and a plurality of customer devices; and
one or more processors, wherein executing the processor-executable instructions causes the one or more processors to:
receive, over a particular period of time and from one or more M2M devices, of the plurality of M2M devices, M2M data that has been captured by the one or more M2M devices;
store, in the memory device, the M2M data that was received from the one or more M2M devices during the particular period of time;
identify, using the association information, which particular customer device, of the plurality of customer devices, is associated with the one or more M2M devices for which M2M data is stored by the server device;
forgo sending, by the server device, the stored M2M data to the identified particular customer device during the particular period of time;
analyze the stored M2M data;
compare the analyzed M2M data to one or more thresholds;
detect, based on the comparing, an event;
output, based on detecting the event and without using a connection-oriented communication technique, a notification to the particular customer device, the notification being based on the stored M2M data;
receive, in response to the notification, a request for M2M data associated with the particular customer device; and
output, based on receiving the request, at least a portion of the stored M2M data, which was stored by the server device and not outputted to the particular customer device during the particular period of time, to the particular customer device.

9. The server device of claim 8, wherein executing the processor-executable instructions further causes the one or more processors to:
receive notification parameters associated with the plurality of customer devices, wherein a set of notification parameters for the particular customer device indicates a manner in which the particular customer device should be notified when M2M data is available for the particular customer device,
wherein outputting the notification is further based on the set of notification parameters for the particular customer device.

10. The server device of claim 9, wherein the set of notification parameters is received from the customer device.

11. The server device of claim 9, wherein the set of notification parameters indicates a periodic interval at which the notification should be outputted by the server device.

12. The server device of claim 8, wherein outputting the notification includes outputting the notification via a User Datagram Protocol ("UDP") transmission.

13. The server device of claim 8, wherein executing the processor-executable instructions causes the one or more processors to:
discard, based on a received indication that the particular customer device has received the outputted M2M data, the M2M data associated with the particular customer device.

14. The server device of claim 8, wherein executing the processor-executable instructions causes the one or more processors to establish, based on the request, a connection with the particular customer device,
wherein executing the processor-executable instructions, to output the received M2M data to the particular customer device, cause the one or more processors to:
transmit the M2M data to the particular customer device via the established connection.

15. A method, comprising:
receiving, by a customer device and from a server device, via a connectionless communication technique, a notification of available machine-to-machine ("M2M") data associated with the customer device, the M2M data having been received and stored by the server device over a particular period of time, the M2M data further not having been sent to the customer device during the particular period of time,
the notification having been sent by the server device based on an analysis performed by the server device on the stored M2M data and a determination, based on the analysis, that one or more values of the stored M2M data exceed one or more thresholds;
establishing, by the customer device, a connection with the server device, the establishing occurring based on receiving the notification;
receiving, by the customer device and via the established connection, the available M2M data associated with the customer device, which was stored by the server device and not sent to the customer device before establishing the connection with the customer device; and
terminating, by the customer device and based on receiving the available M2M data, the established connection.

16. The method of claim 15, wherein the connectionless communication technique includes a User Datagram Protocol ("UDP") transmission.

17. The method of claim 15, wherein the connection includes a Transmission Control Protocol ("TCP") connection.

18. The method of claim 15, further comprising outputting, via the connection, an indication that the M2M data has been successfully received,
- wherein the terminating occurs based on outputting the indication that the M2M data has been successfully received.

19. The method of claim 1, wherein the M2M data includes data captured by one or more sensors of the one or more M2M devices.

20. The server device of claim 8, wherein the M2M data includes data captured by one or more sensors of the one or more M2M devices.

* * * * *